(12) United States Patent
Liu

(10) Patent No.: US 9,490,498 B2
(45) Date of Patent: Nov. 8, 2016

(54) MERCURY-FREE LEAD-FREE BUTTON BATTERY

(76) Inventor: Bin Liu, Guangdong (CN)

(*) Notice: Subject to any disclaimer, the term of this patent is extended or adjusted under 35 U.S.C. 154(b) by 132 days.

(21) Appl. No.: 14/361,703

(22) PCT Filed: Nov. 30, 2011

(86) PCT No.: PCT/CN2011/083260
§ 371 (c)(1),
(2), (4) Date: May 30, 2014

(87) PCT Pub. No.: WO2013/078652
PCT Pub. Date: Jun. 6, 2013

(65) Prior Publication Data
US 2014/0295254 A1    Oct. 2, 2014

(51) Int. Cl.
*H01M 10/04* (2006.01)
*H01M 2/14* (2006.01)
*H01M 2/02* (2006.01)
*H01M 2/04* (2006.01)
*H01M 2/12* (2006.01)

(52) U.S. Cl.
CPC ....... *H01M 10/0427* (2013.01); *H01M 2/0222* (2013.01); *H01M 2/0413* (2013.01); *H01M 2/12* (2013.01); *H01M 2/14* (2013.01); *H01M 2/0287* (2013.01)

(58) Field of Classification Search
CPC . H01M 10/0427; H01M 2/14; H01M 2/0222
See application file for complete search history.

(56) References Cited

U.S. PATENT DOCUMENTS

| | | | | |
|---|---|---|---|---|
| 6,602,629 B1* | 8/2003 | Guo | ...................... | B32B 15/015 429/171 |
| 2004/0197645 A1* | 10/2004 | Buckle | ................ | H01M 2/0222 429/174 |
| 2007/0128495 A1* | 6/2007 | Bobowick | ........... | H01M 2/0222 429/406 |
| 2010/0003596 A1* | 1/2010 | Sato | ...................... | H01M 4/244 429/164 |
| 2011/0059370 A1* | 3/2011 | Sawayama | .......... | H01M 2/1613 429/326 |

* cited by examiner

Primary Examiner — Stewart Fraser
(74) Attorney, Agent, or Firm — Leong C. Lei

(57) ABSTRACT

A mercury-free lead-free button battery includes a negative cap, a cathode material, a gasket ring, a positive can, an anode material, and a diaphragm. The positive can and the negative cap are combined. The gasket ring is clamped between the positive can and the negative cap for separating the positive can from the negative cap. The cathode material is arranged on the bottom of the positive can. The diaphragm is arranged on the cathode material. The anode material is arranged between the negative cap and the diaphragm. A partition unit is arranged between the negative cap and the anode material for separating the anode material from the negative cap and conductively connecting the anode material and the negative cap. The partition unit ensures disconnection between the anode material and the negative cap and therefore safety of the battery by preventing expansion, weeping and even that would otherwise happen.

12 Claims, 9 Drawing Sheets

MERCURY-FREE LEAD-FREE BUTTON BATTERY

BACKGROUND OF THE INVENTION

1. Technical Field

The present invention relates to manufacturing of chemical power sources and batteries, and more particularly to mercury-free lead-free button batteries, including alkaline zinc-manganese button batteries and silver oxide button batteries.

2. Description of Related Art

Please refer to FIG. 1 for the typical configuration of a conventional button battery, which comprises a negative cap 10', a cathode material 20', a gasket ring 30', an anode material 40', a positive can 50' and a diaphragm 60' that separates the cathode material 20' from the anode material 40'. The positive can 50' and the negative cap 10' are combined in a buckling manner. The gasket ring 30' is damped between the positive can 50' and the negative cap 10', so as to separate the positive can 50' from the negative cap 10'. The cathode material 20' is deposited on an inner bottom of the positive can 50'. The diaphragm 60' is arranged on the cathode material 20'. The anode material 40' is arranged between the negative cap 10' and the diaphragm 60'. The anode material 40' is mercury-free lead-free zinc gel. Generally, the negative cap 10' is made by punching an iron sheet or an iron-based metal sheet. Contact between the anode material 40' and low hydrogen overpotential metals such as iron is likely to lead to hydrogen evolution reaction. Thus, for preventing the anode material 40' from contacting the metal matrix of the negative cap 10' and thereby preventing any hydrogen evolution reaction, the existing mercury-free lead-free button battery has the negative cap 10' plated with a layer of high hydrogen overpotential metal, such as indium or tin, so as to separate the anode material 40' from the metal matrix of the negative cap 10', thereby preventing hydrogen evolution reaction otherwise caused by the contact between the anode material 40' and the metal matrix of the negative cap 10'.

While the foregoing indium- or tin-plated negative cap can, to a certain extent, separate the anode material from the metal matrix of the negative cap, there are still shortcomings existing in the conventional mercury-free lead-free button battery in terms of configuration and function when it is put into practical use. The shortcomings can hinder the mercury-free lead-free button battery from achieving its optimal effectiveness and performance, and are summarized as below.

First, due to its own configuration, the negative cap tends have some electroplating-related problems happening in the indium- or tin-plated layer, such as uneven thickness, less density, porosity, and tendencies towards scratch, removal, oxidization and whiskers. Poor electroplating on the negative cap increases the risk of contact between the anode material and the negative cap's metal matrix made of low hydrogen overpotential metal such as iron. Such contact can lead to hydrogen evolution reaction that generates hydrogen and puts the mercury-free lead-free button battery in risk of expansion, weeping and, even worse, explosion.

Second, in the process of indium- or tin-plating for the negative cap, the negative cap is first overall coated with a layer of indium or tin, and then for better appearance or functionality, the indium or tin coated on the outer surface of the negative cap is chemically removed so that only the indium or tin coated on the inner surface of the negative cap is left. Such a process generates a considerable amount of industrial sewage that contains heavy-metal ions, such as indium, chrome or copper, and is seriously adverse to the environment. In the meanwhile, since indium is a rear and expensive metal, the removed indium causes wasting of resources and heavy burden to the related manufactures.

Third, one more major functional defect of the existing mercury-free lead-free button battery is that when the battery undergoes continuous discharge for heavy loads, there is a risk of expansion or explosion. This is a safety concern that should be addressed Briefly, the existing devices have serious inherent defects, and there is a need for a novel technical scheme that can solve these problems and make alkaline button batteries get mercury free in a safe and environmentally friendly way.

SUMMARY OF THE INVENTION

Hence, the present invention is aimed at addressing the shortcomings of the conventional devices. The primary objective of the present invention is to provide a mercury-free lead-free button battery, which can effectively improve the conventional mercury-free lead-free button batteries by solving the problem related to the poorly electroplated cathode and by addressing the safety concern about continuous discharge due to heavy loads.

Another the present invention objective of the present invention is to provide a mercury-free lead-free button battery, which can effectively improve the conventional mercury-free lead-free button batteries by eliminating the need of an indium- or tin-plating process for the negative cap indium that is adverse to the environment and increases the manufacturing costs.

For achieving the above-mentioned objectives, the present invention implemented the technical schemes as described below.

A mercury-free lead-free button battery comprises a negative cap, a cathode material, a gasket ring, a positive can, an anode material conductively connected to the negative cap, and a diaphragm that separates the cathode material from the anode material. The positive can and the negative cap are combined in a buckling manner. The gasket ring is damped between the positive can and the negative cap, so as to separate the positive can from the negative cap. The cathode material covers an inner bottom of the positive can. The diaphragm is arranged on the cathode material. The anode material is installed between the negative cap and the diaphragm. A partition unit is arranged between the negative cap and the anode material for separating the anode material from the negative cap and conductively connecting the anode material and the negative cap.

According to a preferred scheme of the present invention, the partition unit comprises a partition membrane and a current collector, the partition membrane covering an inner surface of the negative cap and reaching a bottom, a top, or a site between the bottom and the top of a rim portion of the negative cap, the partition membrane separating the anode material from the negative cap, and the current collector conductively connecting between the anode material and the negative cap.

According to a preferred scheme of the present invention, the partition membrane is made of an alkali-resistant material that is pervious to hydrogen and not pervious to electrolyte, wherein the material is PP, PVC, PA, PE, PTFE or a modified material thereof.

According to a preferred scheme of the present invention, the current collector is a leading wire with two ends thereof conductively connected to the rim portion of the negative cap or to a ball portion of the negative cap, respectively, and with a middle part thereof conductively connected to the anode material.

According to a preferred scheme of the present invention, the middle part of the leading wire extends straight and is perpendicular to an axis of the button battery.

According to a preferred scheme of the present invention, the current collector includes a circular segment that has an L-like sectional shape, wherein the circular segment has a bottom thereof conductively connected to the anode material, and a top thereof conductively connected to the rim portion of the negative cap to a ball portion of the negative cap.

According to a preferred scheme of the present invention, the current collector is made of a metal material that does not perform a hydrogen evolution reaction with the anode material, and is pure copper or a copper-based alloy.

According to a preferred scheme of the present invention, the current collector is plated with indium, tin or an indium-tin alloy.

According to a preferred scheme of the present invention, the partition unit is a conductive membrane that covers an inner surface of the negative cap and reaches a bottom, a top or a site between the bottom and the top of a rim portion of the negative cap, the conductive membrane separating the anode material from the negative cap, and the conductive membrane conductively connecting between the anode material and the negative cap.

According to a preferred scheme of the present invention, the conductive membrane is made of an alkali-resistant, electrically conductive material that is pervious to hydrogen and not pervious to electrolyte, wherein the material is a graphite-based composite, a carbon black-based composite, a pervious-to-hydrogen alloy or a pervious-to-hydrogen alloy composite.

According to a preferred scheme of the present invention, a vent is provided on the negative cap or capillary channels are provided between a rim portion of the negative cap and the partition unit for exhaust gas.

According to a preferred scheme of the present invention, the negative cap is made by punching an iron sheet or an iron-based metal sheet, and is plated with at least one layer of nickel, or the negative cap is made by directly punching a pre-plated metal sheet or a metal laminated sheet.

According to a preferred scheme of the present invention, the pre-plated metal sheet is a nickel-plated steel band or a steel band having a side plated with nickel and a revise plated with nickel and copper successively.

According to a preferred scheme of the present invention, the metal laminated sheet is a nickel/stainless steel/nickel-, nickel/iron/nickel-, nickel/stainless steel/copper-, or nickel/iron/copper-three-layer composite steel band, or a nickel/stainless steel two-layer composite steel band.

According to a preferred scheme of the present invention, the anode material is mercury-free lead-free zinc gel.

As compared to the prior art, the present invention has obvious advantages and benefits due to the foregoing technical schemes.

First, the negative cap and the anode material are separated from contacting each other by the partition unit arranged therebetween, so the battery is free from the risk of hydrogen evolution reaction. The present invention uses the partition unit instead of the indium- or tin-plated anode material that is used conventionally to separate the metal matrix of the negative cap. This on one hand ensures the disconnection between the anode material and the negative cap, thereby effectively preventing the battery from expansion, weeping or explosion that would otherwise happen when the anode material and the negative cap contacts each other, eliminating the related safety concern, and improving the safety of the battery, and on the other hand eliminates the process of plating indium or tin on the negative cap, so as to effectively avoid chemically removing the indium- or tin layer and in turn generating industrial sewage that contains heavy-metal ions, such as indium, chrome or copper and pollutes the environment. Therefore, the present invention is favorable to environmental protection and economical to the related manufacturers.

Second, the vent provided on the negative cap or the capillary channels provided between the rim portion of the negative cap and the partition unit serve to exhaust hydrogen generated in the button battery during hydrogen evolution reaction, so as to prevent gas accumulation inside the button battery and secure the battery from expansion, weeping and explosion, further improving the safety of the product.

DETAILED DESCRIPTION OF THE INVENTION

Figure 1:
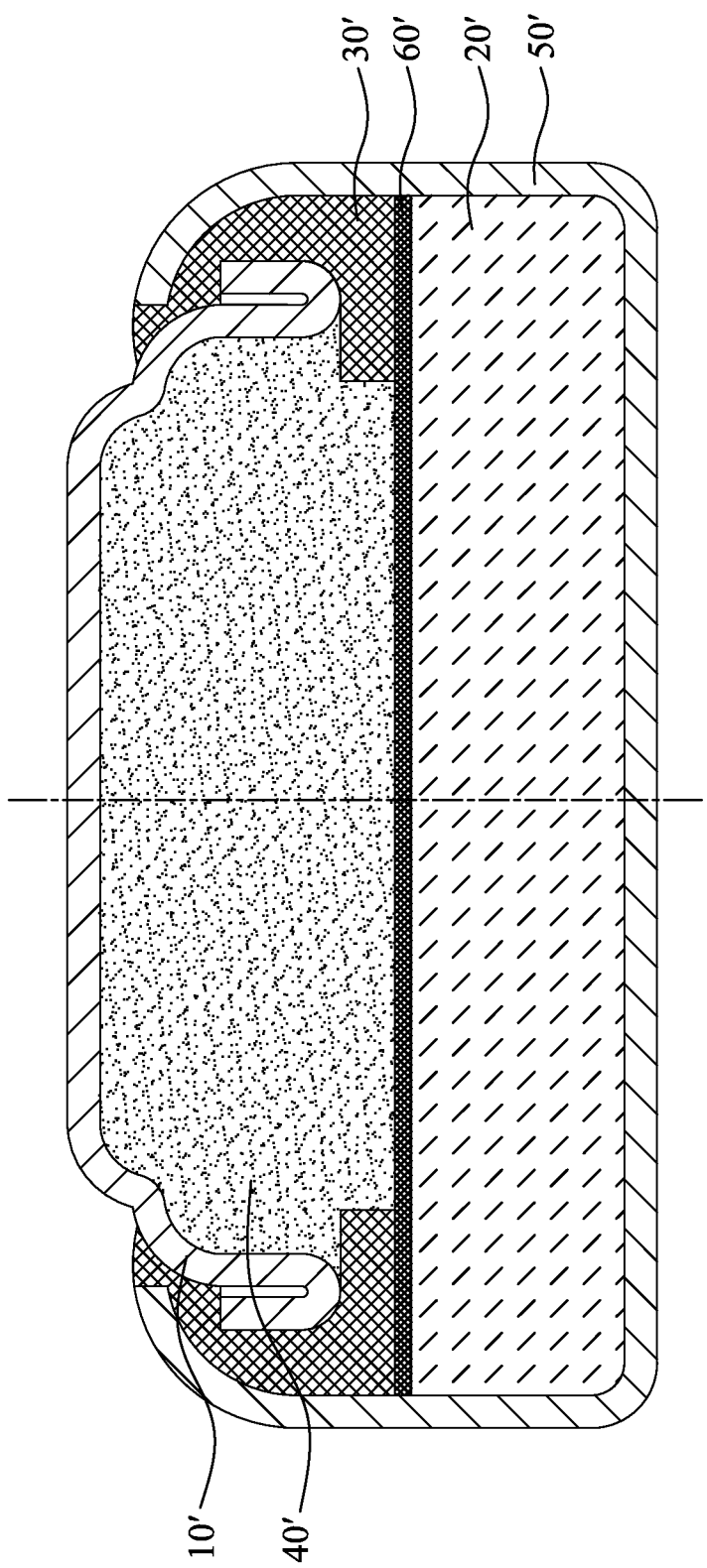
FIG. 1 is a cross-sectional view of the conventional button battery.
Figure 2:
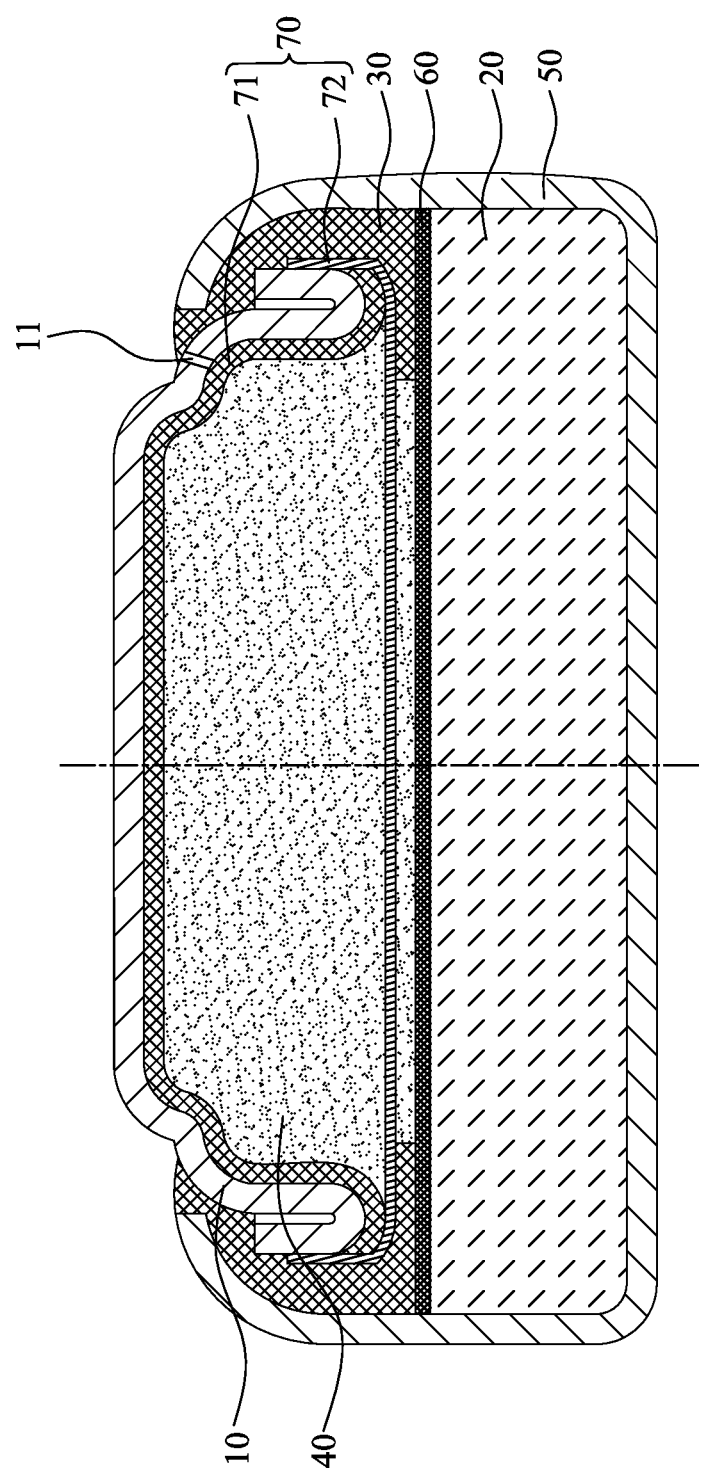
FIG. 2 is a cross-sectional view of the first preferred embodiment of the present invention.

Please refer to FIG. 2 for the configuration of the first preferred embodiment of the present invention, which comprises a negative cap 10, a cathode material 20, a gasket ring 30, an anode material 40 conductively connected to the negative cap 10, a positive can 50 and a diaphragm 60 for separating the cathode material 20 from the anode material 40.

The positive can 50 and the negative cap 10 are combined in a buckling manner. The gasket ring 30 is damped between the positive can 50 and the negative cap 10, so as to separate the positive can 50 from the negative cap 10. The cathode material 20 is deposited on the inner bottom of the positive can 50. The diaphragm 60 is arranged on the cathode material 20. The anode material 40 is installed between the negative cap 10 and the diaphragm 60. The anode material 40 is mercury-free lead-free zinc gel.

Therein, the negative cap 10 is made by punching an iron sheet or an iron-based metal sheet. The negative cap is plated with at least a layer of nickel, and may additionally be plated with another metal layer, such as one of gold, for enhanced esthetic appearance of the negative cap 10. Alternatively, the negative cap 10 is directly made by punching pre-plated metal sheet or metal laminated sheet. The pre-plated metal sheet is a nickel-plated steel band or a steel band having a side plated with nickel and a revise plated with nickel and copper successively. The metal laminated sheet is a nickel/stainless steel/nickel-, nickel/iron/nickel-, nickel/stainless steel/copper-, or nickel/iron/copper-three-layer composite steel band, or a nickel/stainless steel-two-layer composite steel band, without limitation. The negative cap 10 is formed with a vent 11. The vent 11 is located near the periphery of the negative cap 10. The vent 11 serves to exhaust hydrogen generated inside the battery during hydrogen evolution reaction, so as to prevent gas from accumulating inside the button battery and causing expansion, weeping or even explosion of the battery.

Furthermore, a partition unit 70 is arranged between the negative cap 10 and the anode material 40. It serves to separate the anode material 40 from the negative cap 10 and conductively connects the anode material 40 and the negative cap 10. In the present embodiment, the partition unit 70 includes a partition membrane 71 and a current collector 72. The partition membrane 71 covers the inner surface of the negative cap 10 to separate the anode material 40 from the negative cap 10. The partition membrane 71 coves the inner surface of the negative cap 10 and reaches the bottom of the rim portion of the negative cap 10. The rim portion refers to a circular segment outside the ball diameter of the negative cap 10. The ball diameter is the maximum diameter of the ball portion of the negative cap 10. The circular segment has a J-like sectional shape. The partition membrane 71 has its periphery sealed to the gasket ring 30, so as to prevent contact between the anode material 40 and the negative cap 10 that leads to hydrogen evolution reaction. The partition membrane 71 is made of an alkali-resistant material that is pervious to hydrogen and not pervious to electrolyte. The material may be PP, PVC, PA, PE, PTFE, or any modified material thereof. The anode material 40 always contains some low hydrogen overpotential metal impurities, such as iron. These impurities tend to have hydrogen evolution reaction with zinc gel when the battery performs continuous discharge under heavy loads and generate hydrogen. The generated gas can then pass through the partition membrane 71 and dissipate through the above-mentioned vent 11, so as to prevent the battery from expansion, weeping and even explosion. The current collector 72 is made of a metal material that does not have hydrogen evolution reaction with the anode material 40. The metal material is pure copper or a copper-based alloy. The current collector 72 is plated with indium or tin or an indium-tin alloy. In the present embodiment, the current collector 72 is made of pure copper. When the copper material has a purity of 99.999% or higher, the current collector 72 may remain bare without plating indium or tin or an indium-tin alloy. And, in the present embodiment, the current collector 72 is in the form of a leading wire. The leading wire conductively connects between the anode material 40 and the negative cap 10, with its two ends conductively connected to the rim portion of the negative cap 10, respectively. The leading wire has its middle part straight extending, perpendicular to the axis of the battery, and conductively connected to the anode material 40.

Figure 3:
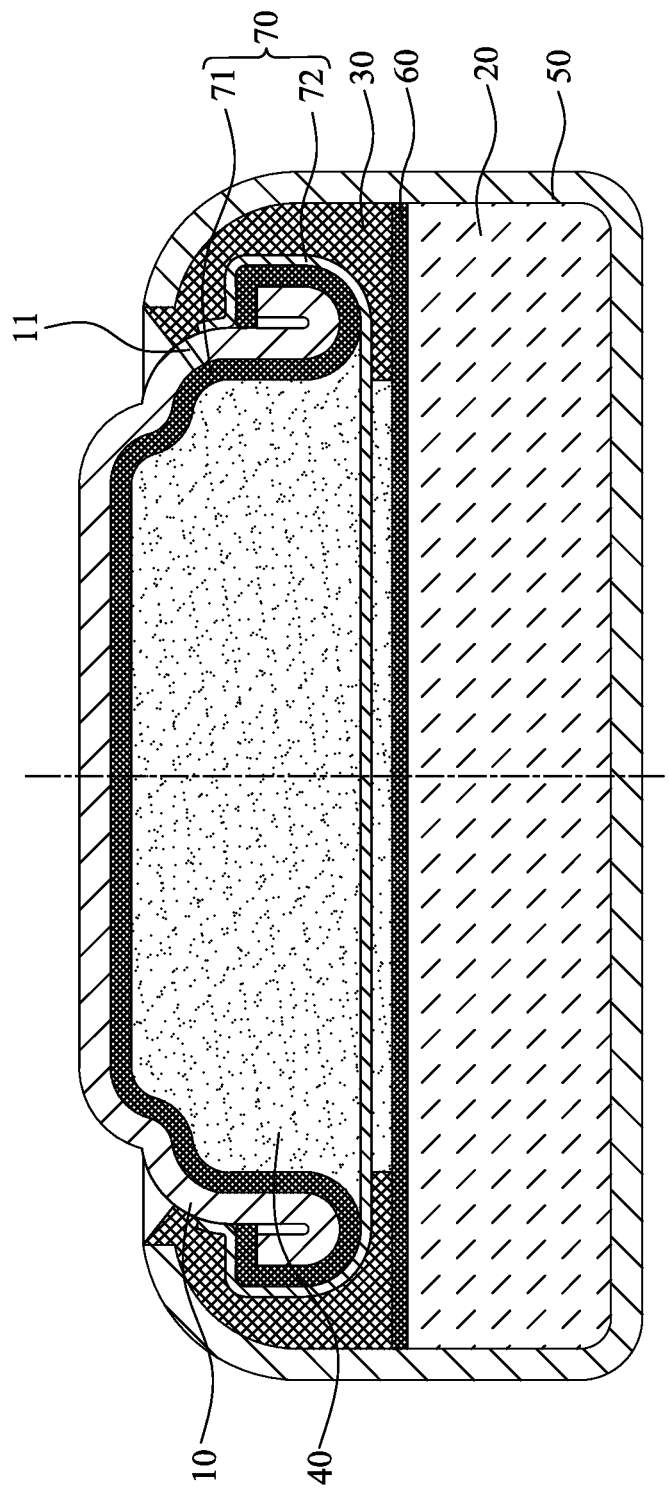
FIG. 3 is a cross-sectional view of the second preferred embodiment of the present invention.

Please refer to FIG. 3 for the configuration of the second preferred embodiment of the present invention. The present embodiment is structurally similar to the foregoing first preferred embodiment except for the difference that, in the present embodiment, the partition membrane 71 covers the inner surface of the negative cap 10 and reaches the top of the rim portion of the negative cap 10. The leading wire has its two ends conductively connected to the ball portion of the negative cap 10 (i.e. the body from the top of the rim portion of the negative cap 10 to the top of the negative cap 10), respectively, so that the contacting area between the leading wire, the partition membrane 71 and the gasket ring 30 is enlarged, thereby ensuring the sealing between the negative cap 10 and the positive can 50, and preventing weeping more effectively.

Figure 4:
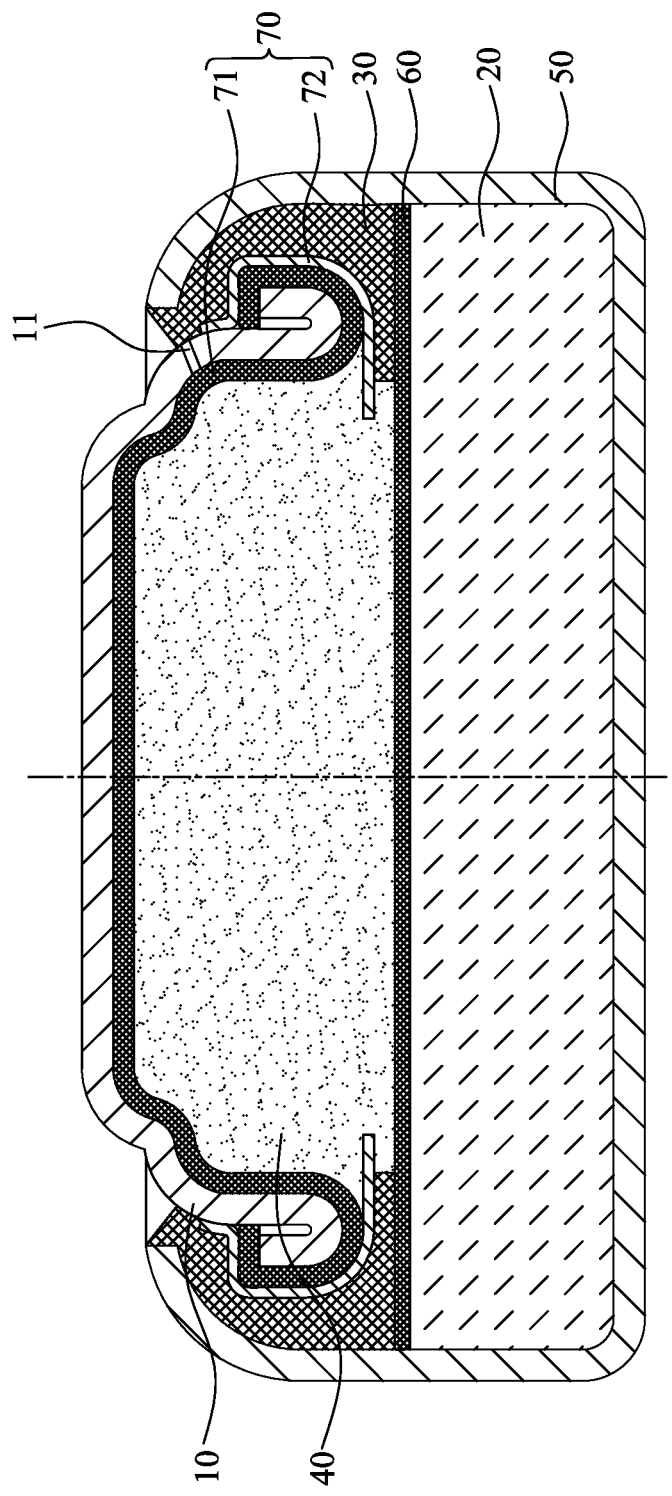
FIG. 4 is a cross-sectional view of the third preferred embodiment of the present invention.

Please refer to FIG. 4 for the configuration of the third preferred embodiment of the present invention. The present embodiment is structurally similar to the foregoing second preferred embodiment except for the difference that, in the present embodiment, the current collector 72 has a circular segment that has an L-like sectional shape. The circular segment has its bottom conductively connected to the anode material 40. The circular segment has its top conductively connected to the ball portion of the negative cap 10. With the circular segment acting as the current collector, the assembling process of the battery is simplified and the conductive connection is more reliable.

Figure 5:
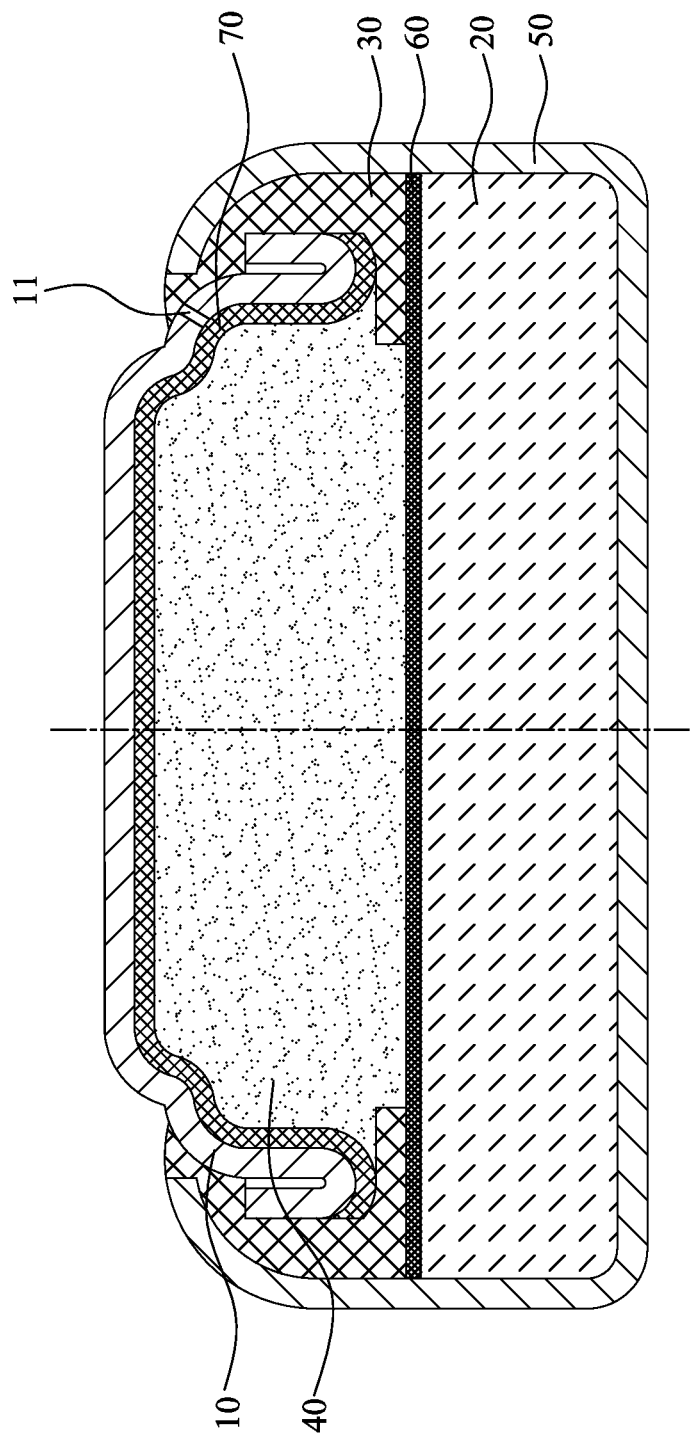
FIG. 5 is a cross-sectional view of the fourth preferred embodiment of the present invention.

Please refer to FIG. 5 for the configuration of the fourth preferred embodiment of the present invention. The present embodiment is structurally similar to the foregoing first preferred embodiment except for the difference that, in the present embodiment, the partition unit 70 is a conductive membrane instead of the partition membrane 71 and the current collector 72 as mentioned in the first preferred embodiment. The conductive membrane covers the inner surface of the negative cap 10 so as to separate the anode material 40 from the negative cap 10. The conductive membrane conductively connects between the anode material 40 and the negative cap 10. In the present embodiment, the conductive membrane covers the inner surface of the negative cap 10 and reaches the bottom of the rim portion of the negative cap 10. The conductive membrane has its periphery sealed with the gasket ring 30, so as to prevent contact between the anode material 40 and the negative cap 10 and in turn prevent hydrogen evolution reaction. The conductive membrane is made of an alkali-resistant, electrically conductive material that is pervious to hydrogen and not pervious to electrolyte. The material may be a graphite-based composite, a carbon black-based composite, a pervious-to-hydrogen alloy or a pervious-to-hydrogen alloy composite. The anode material 40 always contains some low hydrogen overpotential metal impurities, such as iron. These impurities tend to have hydrogen evolution reaction with zinc gel when the battery performs continuous discharge under heavy loads and generate hydrogen. The generated gas can then pass through the partition membrane 71 and dissipate out through the above-mentioned vent 11, so as to prevent the battery from expansion, weeping and even explosion.

Figure 6:
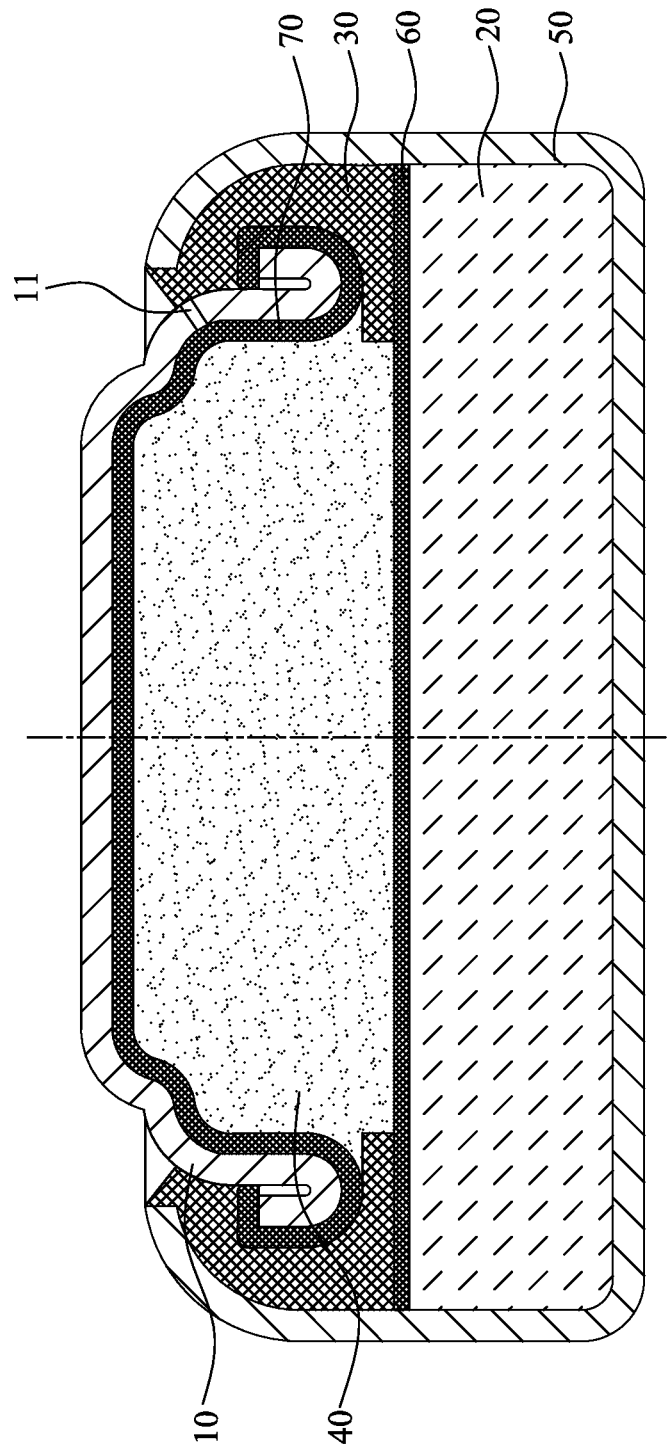
FIG. 6 is a cross-sectional view of the fifth preferred embodiment of the present invention.

Please refer to FIG. 6 for the configuration of the fifth preferred embodiment of the present invention. The present embodiment is structurally similar to the foregoing fourth preferred embodiment except for the difference that, in the present embodiment, the conductive membrane covers the inner surface of the negative cap 10 and reaches the top of the rim portion of the negative cap 10, so that the contacting area between the conductive membrane and the gasket ring 30 is enlarged, thereby ensuring the sealing between the negative cap 10 and the positive can 50, and preventing weeping more effectively.

Figure 7:
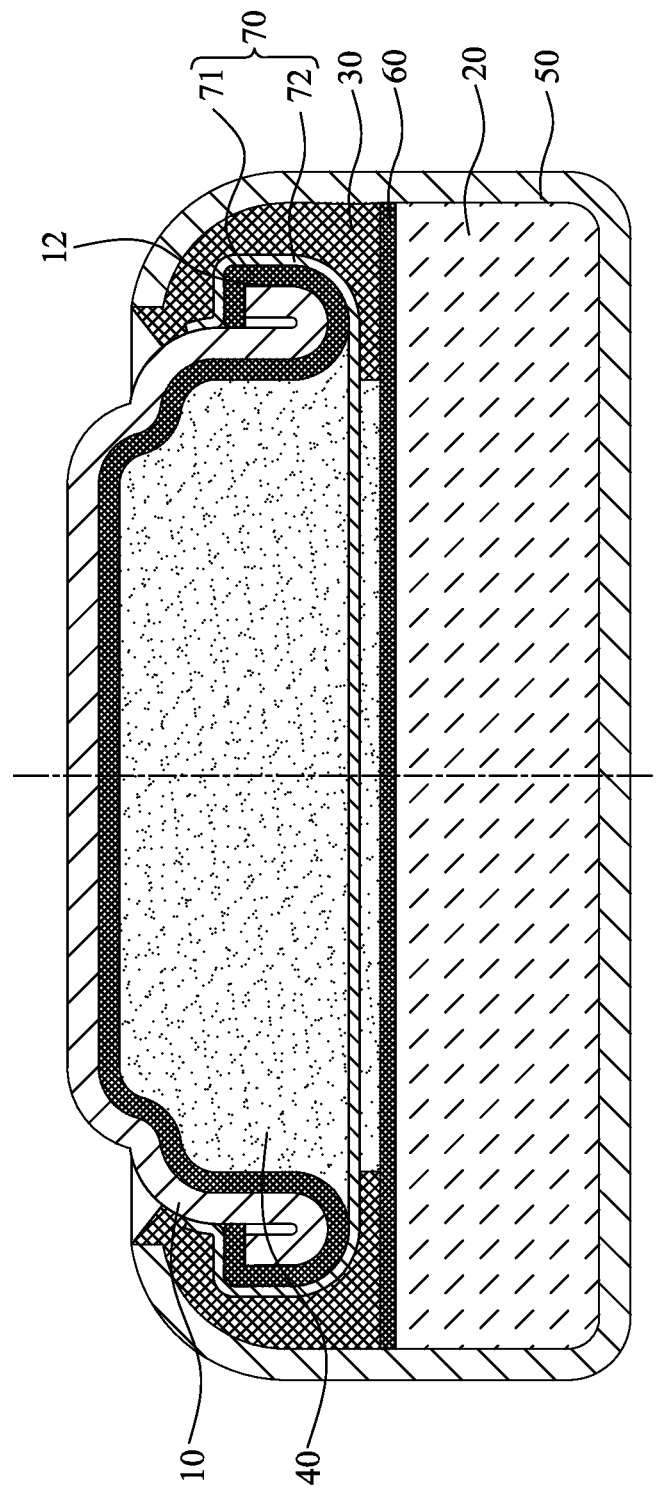
FIG. 7 is a cross-sectional view of the sixth preferred embodiment of the present invention.

Please refer to FIG. 7 for the configuration of the sixth preferred embodiment of the present invention. The present embodiment is structurally similar to the foregoing second preferred embodiment except for the difference that, in the present embodiment, instead of the vent 11, the negative cap 10 has capillary channels 12 between the rim portion of the negative cap 10 and the partition membrane 71 of the partition unit 70 for exhausting gas. These capillary channels 12 in place of the vent 11 of the second preferred embodiment to allow hydrogen generated inside the button battery during hydrogen evolution reaction, so as to prevent gas from accumulating within the button battery and in turn prevent the battery from expansion, weeping and explosion, thereby further improving the safety of the product.

Figure 8:
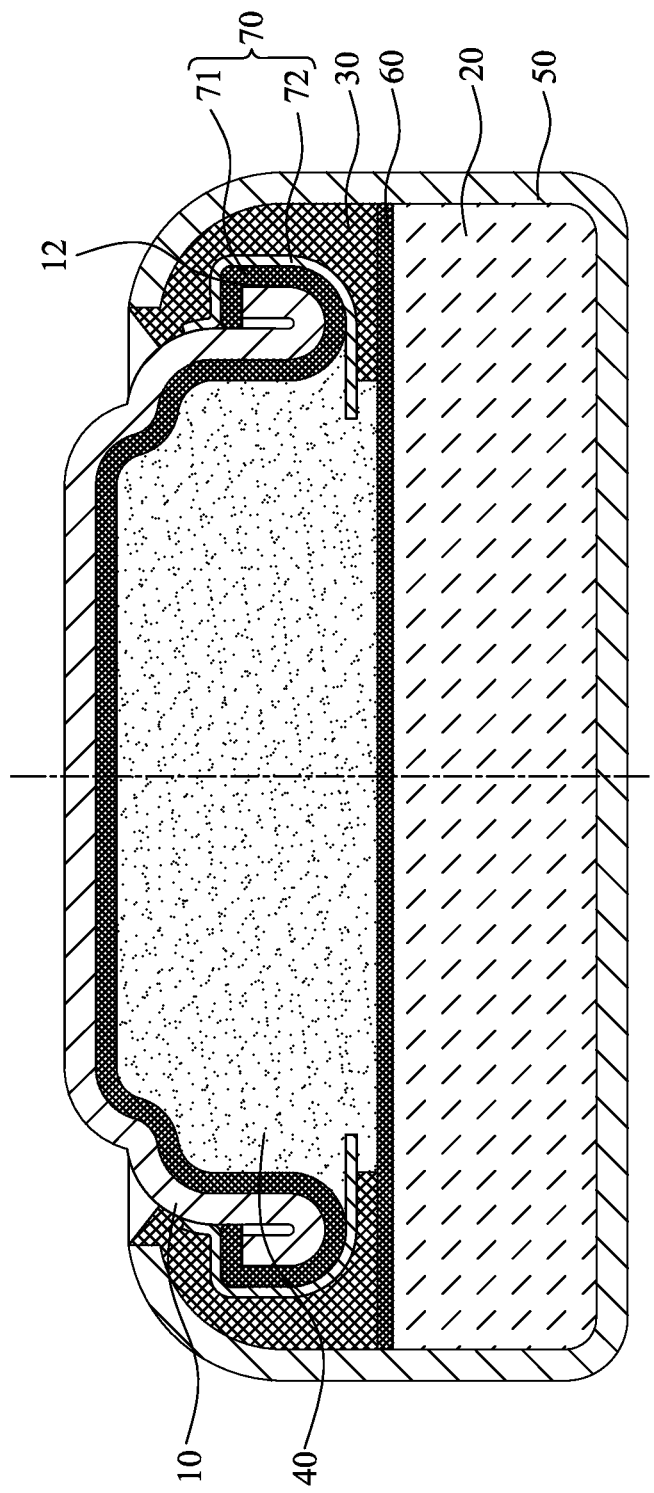
FIG. 8 is a cross-sectional view of the seventh preferred embodiment of the present invention.

Please refer to FIG. 8 for the configuration of the seventh preferred embodiment of the present invention. The present embodiment is structurally similar to the foregoing third preferred embodiment except for the difference that, in the present embodiment, instead of the vent 11, the negative cap 10 has capillary channels 12 between the rim portion of the negative cap 10 and the partition membrane 71 of the partition unit 70 for exhausting gas. These capillary channels 12 in place of the vent 11 of the second preferred embodiment to allow hydrogen generated inside the button battery during hydrogen evolution reaction, so as to prevent gas from accumulating within the button battery and in turn prevent the battery from expansion, weeping and explosion, thereby further improving the safety of the product.

Figure 9:
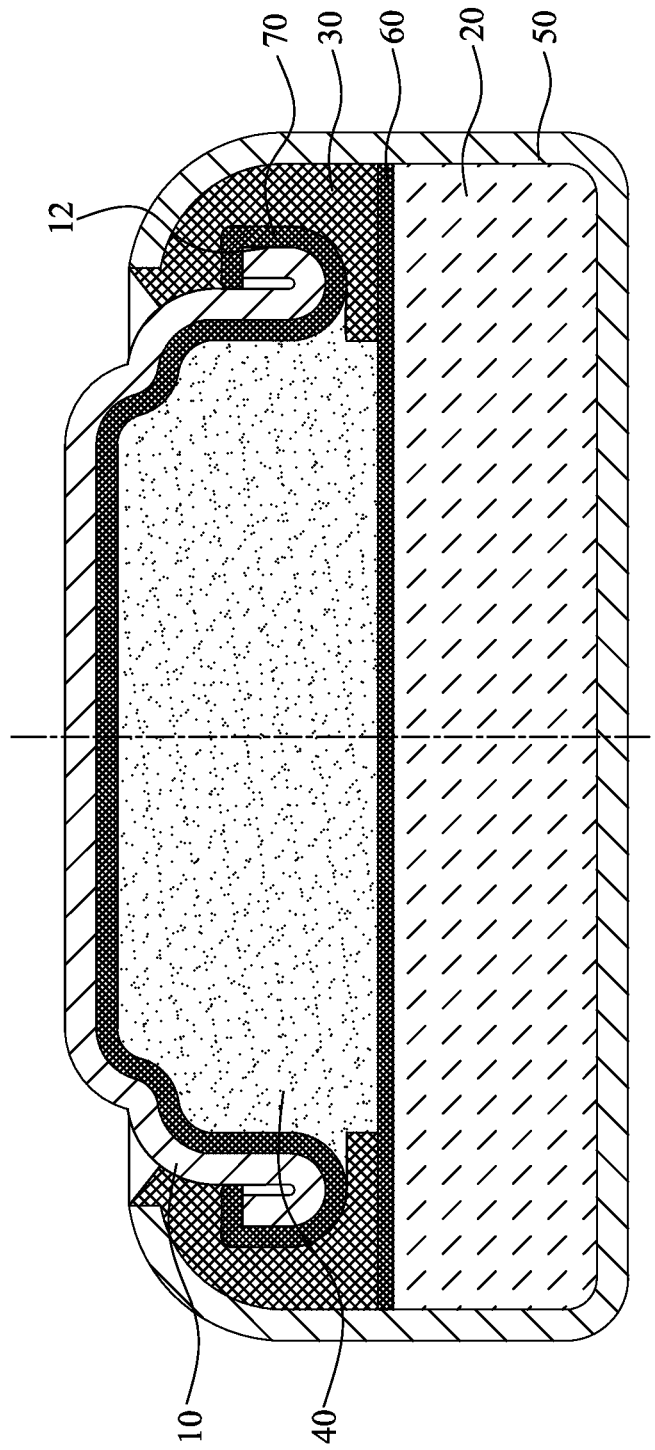
FIG. 9 is a cross-sectional view of the eighth preferred embodiment of the present invention.

Please refer to FIG. 9 for the configuration of the eighth preferred embodiment of the present invention. The present embodiment is structurally similar to the foregoing fifth preferred embodiment except for the difference that, in the present embodiment, instead of the vent 11, the negative cap 10 has capillary channels 12 between the rim portion of the negative cap 10 and the partition membrane 71 of the partition unit 70 for exhausting gas. These capillary channels 12 in place of the vent 11 of the second preferred embodiment to allow hydrogen generated inside the button battery during hydrogen evolution reaction, so as to prevent gas from accumulating within the button battery and in turn prevent the battery from expansion, weeping and explosion, thereby further improving the safety of the product.

As demonstrated by the embodiments as shown in FIG. 7 through FIG. 9, when the partition membrane 71 or the conductive membrane of the partition unit 70 reaches the top of the rim portion of the negative cap 10, the present invention may have capillary channels 12 between the rim portion of the negative cap 10 and the partition unit 70 instead of the vent 11 for exhausting gas.

The present invention features its novel design. First, the negative cap and the anode material are separated from contacting each other by the partition unit arranged therebetween, so the battery is free from the risk of hydrogen evolution reaction. The present invention uses the partition unit instead of the indium- or tin-plated anode material that is used conventionally to separate the metal matrix of the negative cap. This on one hand ensures the disconnection between the anode material and the negative cap, thereby effectively preventing the battery from expansion, weeping or explosion that would otherwise happen when the anode material and the negative cap contacts each other, eliminating the related safety concern, and improving the safety of the battery, and on the other hand eliminates the process of plating indium or tin on the negative cap, so as to effectively avoid chemically removing the indium- or tin layer and in turn generating industrial sewage that contains heavy-metal ions, such as indium, chrome or copper and pollutes the environment. Therefore, the present invention is favorable to environmental protection and economical to the related manufacturers. Second, the vent provided on the negative cap or the capillary channels provided between the rim portion of the negative cap and the partition unit serve to exhaust hydrogen generated in the button battery during hydrogen evolution reaction, so as to prevent gas accumulation inside the button battery and secure the battery from expansion, weeping and explosion, further improving the safety of the product.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A mercury-free lead-free button battery, comprising a negative cap, a cathode material, a gasket ring, a positive can, an anode material that is conductively connected to the negative cap and a diaphragm that separates the cathode material from the anode material; the positive can and the negative cap being combined in a buckling manner; the gasket ring being clamped between the positive can and the negative cap, so as to separate the positive can from the negative cap; the cathode material being deposited on an inner bottom of the positive can, the diaphragm being arranged on the cathode material; and the anode material being installed between the negative cap and the diaphragm; the mercury-free lead-free button battery being characterized in that a partition unit is arranged between the negative cap and the anode material for separating the anode material from the negative cap and conductively connecting the anode material and the negative cap, and the partition unit comprises a partition membrane and a current collector, the partition membrane covering an inner surface of the negative cap and reaching a bottom, a top, or a site between the bottom and the top of a rim portion of the negative cap, the partition membrane separating the anode material from the negative cap, and the current collector conductively connecting between the anode material and the negative cap.

2. The mercury-free lead-free button battery of claim 1, being characterized in that the partition membrane is made of an alkali-resistant material that is pervious to hydrogen and not pervious to electrolyte, wherein the material is PP, PVC, PA, PE, PTFE or a modified material thereof.

3. The mercury-free lead-free button battery of claim 1, being characterized in that the current collector is a leading wire with two ends thereof conductively connected to the rim portion of the negative cap or to a ball portion of the negative cap, respectively, and with a middle part thereof conductively connected to the anode material.

4. The mercury-free lead-free button battery of claim 3, being characterized in that the middle part of the leading wire extends straight and is perpendicular to an axis of the button battery.

5. The mercury-free lead-free button battery of claim 1, being characterized in that the current collector includes a circular segment that has an L-like sectional shape, wherein the circular segment has a bottom thereof conductively connected to the anode material, and a top thereof conductively connected to the rim portion of the negative cap to a ball portion of the negative cap.

6. The mercury-free lead-free button battery of claim 1, being characterized in that the current collector is made of a metal material that does not perform a hydrogen evolution reaction with the anode material, and is pure copper or a copper-based alloy.

7. The mercury-free lead-free button battery of claim 6, being characterized in that the current collector is plated with indium, tin or an indium-tin alloy.

8. The mercury-free lead-free button battery of claim 1, being characterized in that a vent is provided on the negative cap or capillary channels are provided between a rim portion of the negative cap and the partition unit for exhaust gas.

9. The mercury-free lead-free button battery of claim 1, being characterized in that the negative cap is made by punching an iron sheet or an iron-based metal sheet, and is plated with at least one layer of nickel, or the negative cap is made by directly punching a pre-plated metal sheet or a metal laminated sheet.

10. The mercury-free lead-free button battery of claim 9, being characterized in that the pre-plated metal sheet is a nickel-plated steel band or a steel band having a side plated with nickel and a revise plated with nickel and copper successively.

11. The mercury-free lead-free button battery of claim 9, being characterized in that the metal laminated sheet is a nickel/stainless steel/nickel-, nickel/iron/nickel-, nickel/stainless steel/copper-, or nickel/iron/copper-three-layer composite steel band, or a nickel/stainless steel two-layer composite steel band.

12. The mercury-free lead-free button battery of claim 1, being characterized in that the anode material is mercury-free lead-free zinc gel.

* * * * *